Inventor
MANFRED WIESSNER
By Irwin S. Thompson
Attorney

United States Patent Office 3,072,034
Patented Jan. 8, 1963

3,072,034
PHOTOGRAPHIC CAMERAS HAVING BUILT-IN EXPOSURE METERS
Manfred Wiessner, Dresden, Germany, assignor to VEB Kamera- und Kinowerke Dresden, Dresden, Germany
Filed July 31, 1961, Ser. No. 128,014
4 Claims. (Cl. 95—10)

The present invention relates to a photographic camera having a built-in exposure meter which is coupled with setting members for exposure factors, and a rear wall which on removal or hinging down conducts a setting member for film sensitivities into an inoperative position, in which a follow-up pointer is pivoted out of the observation window of the exposure meter.

The aim of the present invention is an improvement with the purpose of obtaining both a simpler style of construction and also a more expedient arrangement, which is usable even in the case of an exposure meter which can shift to a zero point and in the case of setting members controlled automatically by an exposure meter, in that for example in the latter case the running off of a spring driven setting member remains blocked by galvanometer pointers remaining in the rest position.

In accordance with the invention this is achieved due to the fact that with the setting member for the film sensitivities there is coupled a cam disc, the nose of which in the return of the cam disc into the rest position actuates a switch lying in the current circuit of the photo-electric cell. The switch preferably short-circuits the photo-electric cell current circuit. The details of the invention may be seen from an illustrated and described example of embodiment.

Figure 1:
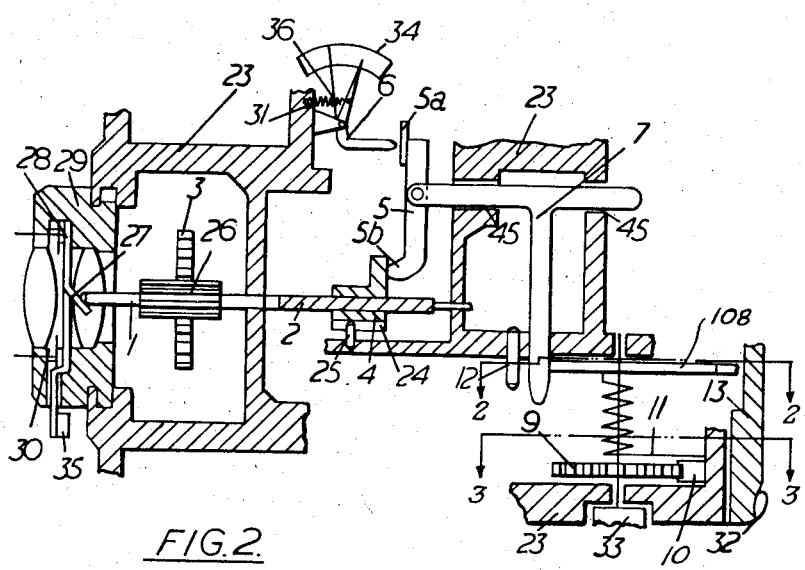
FIGURE 1 shows the gear arrangement of the exposure control device.

In the only partly illustrated camera housing 23 a threaded spindle 2 is rotatably mounted. The threaded spindle 2 carries a control nut 4, which is guided rectilinearly by means of a slot 24 and of a pin 25 mounted firmly in the camera housing 23. The threaded spindle 2 also carries a pinion 26, which meshes with a setting member 3 for the exposure times. The end 1 of the threaded spindle 2 is connected with the oblique surface 27 of a diaphragm ring 28, which in known manner is arranged in the preferably interchangeable objective lens 29 and rotates diaphragm blades 30.

Figure 2:
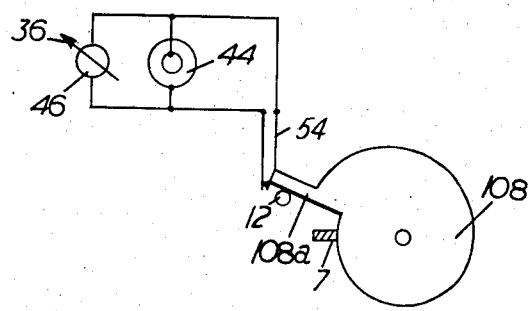
FIGURE 2 is a part sectional view along the line 2—2 in FIGURE 1 showing the cam disc, stop member, and follower only of the mechanical parts and the electrical circuit of the meter schematically represented.
Figure 3:
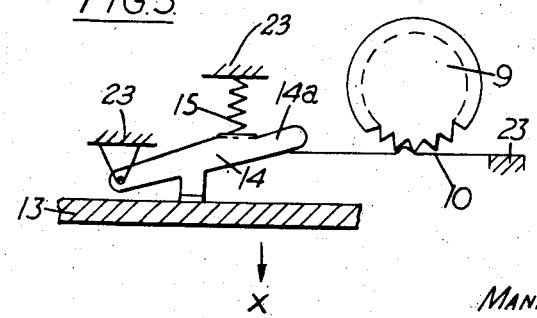
FIGURE 3 is a part sectional view along the line 3—3 in FIGURE 1 showing the catch disc with the release lever, the housing for anchoring various parts being shown diagrammatically.

As a result of a spring 31 acting on a follow-up pointer 6 a double lever 5 presses with its end 5b against the control nut 4, this lever being mounted rotatably on a setting lever 7. At the same time the spring 31 presses this setting lever 7 guided in a groove 45 against a cam disc 108, which is connected with a catch disc 9 and a setting member 33. A return spring 11 anchored in the camera housing 23 and connected with the cam disc 108 seeks to rotate the cam disc 108 and the catch disc 9 into an end position in which the nose 108a lies on the stop 12 (see FIG. 2), a switch 54 being closed at the same time, which switch lies parallel with a galvanometer 46 on a photoelectric cell 44. This however is prevented by a catch spring 10 engaging with the catch disc 9 (see FIG. 3).

The rear wall 13 is detachably secured on the camera housing 23 by means of the clip springs 32 (see FIG. 1). As a result of the release spring 15 the release lever 14, the release arm 14a of which lies in the path of the catch spring 10, presses against this rear wall.

The manner of operation of the device is as follows:
After the insertion of a film the rear wall 13 is secured by means of clip springs 32 in the camera housing 23. This securing of the rear wall 13 (see FIG. 3) rotates the release lever 14 against the release spring 15, which in this movement is tensioned, and brings the catch spring 10 into engagement with the catch disc 9. Now by rotation of the setting member 33 in relation to a scale (not shown separately) with values for the film sensitivities the cam disc 108 can be rotated against the return spring 11. In this movement the switch 54 opens, so that the galvanometer 46 responds. The catch spring 10 prevents running back of the cam disc 108, which through the rectilinearly guided setting lever 7 and the end 5a of the double lever 5 pivots the follow-up pointer 6 according to the given film sensitivity into the visible range of the setting window 34. Then by grasping of the setting member 35 for the diaphragm extending out of the objective lens and of the setting member 3 for the exposure times mounted on the camera side, through the threaded spindle 2 and the control nut 4 the follow-up pointer 6 can be brought into coincidence with the pointer 36 of an exposure meter of known style of construction.

On removal of the rear wall in the direction of the arrow "X" for the purpose of insertion of a new film due to the release spring 15 the release lever 14 follows the rear wall. Here the release arm 14a strikes upon the catch spring 10 and brings it out of engagement with the catch disc 9. Consequently the return spring 11 can rotate the cam disc 108 into an end position in which the nose 108a strikes against the stop 12 and the switch 45 is closed. In this position the pointer 36 is drawn out of the setting window 34 as a result of the existing short-circuit.

I claim:

1. In a photographic camera having a housing, an exposure meter arranged in the housing and including a photo-electric cell in circuit with a moving coil, a first exposure factor setting means coupled with the meter, a second exposure factor setting means arranged in the housing, and coupling means for coupling the second exposure factor setting means with said meter, said housing having a removable rear wall; the provision of a switch in the circuit of the meter, a control member for actuating said switch to render the meter inoperative and also for controlling said coupling means to de-couple the second setting means from said meter, and releasable means for holding said control member in a posititon where the switch is not actuated, said releasable means being actuated by said rear wall to permit the control member to effect actuation of the switch and de-coupling of the second setting means from the meter on removal of said rear wall from the housing.

2. In a photographic camera having a housing, an exposure meter arranged in the housing and including a photo-electric cell in circuit with a moving coil, a first exposure factor setting means coupled with said meter, a second exposure factor setting means arranged in the housing, and coupling means for coupling said second exposure factor setting means with said meter, said housing having a removable rear wall; the provision of a cam element rotatably mounted in the housing and connected to said second exposure factor setting means so as to be operable by the latter, a switch in the circuit of the meter and operable by said cam element, a follower forming part of the said coupling means, which follower is in engagement with said cam element and is movable into a position by said cam element to de-couple said second setting means from said meter, a return spring element tending to rotate said cam element and said second setting means into their normal position of rest, and releasable means for holding said cam element and said second setting means in their set position, said releasable means being actuated by said rear wall to permit the cam element to effect actuation of the switch and de-coupling of the second setting means from the meter on removal of said rear wall from the housing.

3. A photographic camera according to claim 2, wherein the releasable means comprises a toothed wheel rotatable by said second setting means, a spring element mounted on the housing and being in engagement with said toothed wheel, a lever pivotally mounted on said housing and capable of moving said spring element out of engagement with said toothed wheel, a second spring element stronger than the first mentioned spring located between said housing and said lever to urge the latter against the rear wall of the housing and to move the lever when said rear wall is removed.

4. In a photographic camera having a housing, an exposure meter arranged in the housing and including a photo-electric cell in circuit with a moving coil provided with a pointer, and a follow-up pointer, said pointers appearing in a window in said housing, a first exposure factor setting means coupled with said follow-up pointer, a second exposure factor setting means having a shaft rotatably mounted in the housing, and coupling means for coupling said second exposure factor setting means with said follow-up pointer, said housing having a removable rear wall; the provision of a cam element mounted on the shaft of said second setting means, a projection on said cam element, a switch in the circuit of the meter and operable by said projection, a follower forming part of said coupling means, which follower is in engagement with said cam element and is movable into a position by said cam element to de-couple said second setting means from said follow-up pointer, a coil return spring located about the shaft of said second setting means tending to rotate said cam element and second setting means into their normal position of rest, and releasable means for holding said cam element and second setting means in their set position; said releasable means being actuated by said rear wall to permit the cam element actuation of the switch and de-coupling of the second setting means from the meter on removal of said rear wall from the housing, whereby both the moving coil pointer and the follow-up pointer move out of the region of the window.

References Cited in the file of this patent

UNITED STATES PATENTS

| 2,975,687 | Greger | Mar. 21, 1961 |
| 2,984,165 | Erlichman | May 16, 1961 |
| 2,993,422 | Rentschler | July 25, 1961 |